United States Patent [19]
Lenhart

[11] Patent Number: 5,478,173
[45] Date of Patent: Dec. 26, 1995

[54] DAMPERLESS CONTROLLED SPEED AIR CONVEYOR

[75] Inventor: Ronald A. Lenhart, Lakewood, Colo.

[73] Assignee: Simplimatic Engineering Company, Lynchburg, Va.

[21] Appl. No.: 80,508

[22] Filed: Jun. 24, 1993

[51] Int. Cl.$^6$ .................................................. B65G 51/03
[52] U.S. Cl. .......................... 406/88; 34/582; 226/97
[58] Field of Search ........................ 406/86, 88, 94, 406/95, 191, 194; 226/97; 34/354, 432, 576, 579, 580, 581, 582, 583, 584, 585

[56] References Cited

U.S. PATENT DOCUMENTS

| | | | |
|---|---|---|---|
| 3,105,720 | 10/1963 | Barker | 406/88 |
| 3,180,688 | 4/1965 | Futer | 406/88 |
| 3,385,490 | 5/1968 | Malmgren et al. | 226/7 |
| 3,437,335 | 4/1969 | Gluskin | 406/88 X |
| 3,733,056 | 5/1973 | Fong | 366/107 |
| 4,014,576 | 3/1977 | Druschel et al. | 406/88 X |
| 4,033,555 | 7/1977 | Fong | 366/101 |
| 4,165,132 | 8/1979 | Hassan et al. | 406/10 |
| 4,392,760 | 7/1983 | Futer | 406/88 |
| 4,456,406 | 6/1984 | Lenhart | 406/88 |
| 4,500,229 | 2/1985 | Cole et al. | 406/88 |
| 4,732,513 | 3/1988 | Lenhart | 406/88 |
| 4,744,702 | 5/1988 | Wiseman et al. | 406/88 |
| 5,037,245 | 8/1991 | Smith | 406/88 |
| 5,209,387 | 5/1993 | Long et al. | 406/88 X |
| 5,357,688 | 10/1994 | Christensen | 34/582 X |

FOREIGN PATENT DOCUMENTS

WO92/04113 3/1992 WIPO.

Primary Examiner—Andrew C. Pike
Attorney, Agent, or Firm—Fields, Lewis, Rost & Smith

[57] ABSTRACT

A damperless, controlled speed, coverless, isometric air conveyor and method for controlling articles en masse or individually at a controlled speed is provided. A first set of louvers extend through the conveyor surface to a common plenum at an incline to the conveying surface so that the air passing through the louvers has downstream force vector of a first magnitude. A second set of louvers extend through the conveyor surface to a common plenum at an incline to the conveyor surface so that the air passing through the louvers has an upstream force vector of a second magnitude which is less than the first magnitude thereby creating a vector force differential in the downstream direction to cause movement of the articles in the downstream direction. An outboard row of louvers along each edge of the conveying surface may be angled in the inboard direction to cause a cross flow of air which creates an air barrier through which a single or sparse flow of articles must move, thereby limiting the speed of the single or sparse articles. The inboard cross flow of air also creates a low pressure drafting effect at the trailing edge of the sparse articles of the mass of articles to assist in maintaining them in an upright position.

15 Claims, 4 Drawing Sheets

Fig_1

Fig_8

Fig_3

Fig_2

Fig_5

Fig_4

Fig_6

Fig_7

Fig_9

Fig_10

DAMPERLESS CONTROLLED SPEED AIR CONVEYOR

TECHNICAL FIELD

This invention relates to an air conveyor apparatus for use with generally cylindrical lightweight articles and more particularly to a damperless conveyor which controls the conveying speed of the articles whether en masse or in a sparse or individual flow of articles.

BACKGROUND ART

In recent years, air conveyors have become popular for conveying lightweight articles, such as cylindrical lightweight beverage containers, both during the manufacturing of the containers and during the filling operation. Such conveyors have enjoyed considerable success because they allow the conveying of the containers at a much higher speed than was possible with mechanical conveyors. These air conveyors have used, in various forms, air jets and louvers for moving the containers along the conveying surface. The angle at which air is introduced to the conveying surface has included jets or louvers directing the air parallel to the direction of movement as well as various angles transversely to the direction of movement. In general, it has been the intent of these devices to use the blowing force of the air to move the containers in the desired direction.

Also, devices have been developed by the invention in which air is supplied through air jets in a manner to take advantage of the Coanda Effect to cause the air to move along the surface of the conveyor and therefore along the lower surface of the container on the conveyor. This effect, together with utilizing the Bernoulli Principle, is utilized to create low pressure in the areas at which the air flows at the highest velocity so as to maneuver the containers in response to changes in air pressure rather than relying on the ability of the device to blow the containers in the desired direction. These principles have been used to create desired high and low pressure areas between adjacent containers to regulate their flow.

Barker, U.S. Pat. No. 3,105,720, shows the use of louvers at opposite ends of cylindrical containers for moving them vertically from one conveyor to another.

Futer, U.S. Pat. No. 3,180,688, discloses a mass conveyor which utilizes a series of louvers and vertical jets. The vertical jets suspend the articles above the conveyor while the louvers provide a downstream propelling force for moving the articles in the downstream direction.

Malmgren et al., U.S. Pat. No. 3,385,490, disclose a device for conveying web or sheet material along a conveyor in which louvers are provided which are angled inwardly from the outboard edges of the conveyor toward the center. An exhaust grid is provided at the center of the device for evacuation of air. This device is intended to center a sheet of material and convey it downstream due to the downstream force component of the air passing through the louvers. The inboard component of the air from the louvers is intended to be equal on both sides and therefore center the sheet material over the conveyor.

Fong, U.S. Pat. Nos. 3,733,056 and 4,033,555, each disclose a conveyor for fluidizing particulate material and utilizes louvers pointed in both a downstream direction and a direction substantially transversely to the direction of movement.

Hassan et al. U.S. Pat. No. 4,165,132, disclose an air conveyor for conveying semiconductor wafers wherein air jets are provided at an inboard angle from the side edges of the conveyor for suspending and centering the wafers over the conveyor. These jets also create a downstream force component which moves the wafer along the conveyor in the downstream direction.

Lenhart, U.S. Pat. No. 4,456,406, discloses a mass conveyor requiring a top cover and utilizes the formation of high pressure areas between articles to form air barriers for the containers to maintain them in a loose separate condition as they move through the conveyor. This is to minimize banging of the containers against each other and potential damage to them due to this banging action.

Lenhart, U.S. Pat. No. 4,732,513, provides a coverless air conveyor in which jets are provided through the conveying surface in a substantially vertical direction with a slight downstream tilt. Side walls are provided to form air dams to create a flowing body of air which enveloped and lifted the respective containers and moved them at a desired speed. However, if any adjustment is desired in the speed of movement of the mass of containers, it is necessary through dampers to vary the volume of air passing through the jets.

All of the foregoing inventions are suitable for their intended purposes. However, in order to control the flow of the articles on the conveyor, it is necessary to provide dampers at various positions along the plenum in order to control the amount of air issuing through the air jets or louvers of any particular location along the conveying surface. This is necessary in order to change the speed of the movement of the articles from one portion of the conveyor to the next to minimize potential damage to the containers as they move from one operative station to another. When using dampers in an effort to control the speed of an article, as the static pressure is varied upward and downward, the velocity from the deck louvers varies accordingly, and as the velocity varies the volume also varies. This makes control very difficult because of the two parallel variables. If the pressure is set too low in an attempt to slow the speed of the article, the article will not be levitated sufficiently above the deck surface and cannot be conveyed. Conversely, if the pressure is set too high, in order to convey the article at the higher speed, the article will be levitated too high above the deck and may wobble, so that it does not flow smoothly down the air conveyor and may tip over, creating a jam along the conveyor.

Furthermore, with the mass air conveyors discussed above, as an article moves from an upstream location to a downstream location, the volume of air acting on each container increases thereby tending to move the articles at greater and greater speeds, toward a terminal velocity. This is particularly true with single or sparse containers moving along the conveyor. Such a condition can result in articles striking each other with sufficient force to cause damage to fragile articles, such as beverage containers.

DISCLOSURE OF THE INVENTION

In accordance with the present invention, a damperless, controlled speed, coverless isometric air conveyor and method for controlling articles en masse at a controlled speed is provided. The term "isometric" as used herein means and refers to opposing air volumes creating opposed force vectors along the upper surface of the deck of the conveyor. A first set of louvers extends through the conveyor surface in a downstream direction at an incline to the conveying surface so that the air passing through the louvers has a downstream force vector of a first magnitude. A second set of louvers extends through the conveyor surface in an upstream direction at an incline to the conveying surface so that the air passing through the louvers has a upstream force vector of a second magnitude which is less than the first magnitude thereby creating a vector force differential in the downstream direction to cause movement of the articles in the downstream direction. The louvers along each edge of the conveying surface may be angled in the inboard direction to cause a cross flow of air which creates an air barrier through which a single or sparse flow of articles must move, thereby limiting the speed of the single or sparse articles. The inboard cross flow of air also creates a low pressure drafting effect at the trailing edge of the sparse articles to assist in maintaining them in an upright position. The term "louver", as used herein, includes any opening through the deck of the conveyor which directs air along or across the conveyor.

More specifically, a first set of longitudinally extending louvers is arranged in alternating longitudinal rows with a second set of longitudinally extending louvers wherein an outboard row of louvers on each side of the deck or conveying surface is always part of the first set. This assures that there is at least one more row of louvers in the downstream direction than in the upstream direction.

Alternatively, multiple rows of longitudinally extending louvers in the downstream direction can be provided with longitudinally extending upstream louvers interspaced therebetween. Also, at least the first outboard row of downstream longitudinally extending louvers can be angled in the inboard direction to provide air flowing transversely of the direction of movement of the containers to create an air barrier to impede movement of single or sparse flow of articles. However, when the conveyor is full of articles the longitudinally extending louvers will all be substantially covered so that the only flow of air is against the bottom of the containers to move them en masse in the desired downstream direction due to the net downstream force vector. The rows of longitudinally extending louvers have been defined as longitudinally traversing the conveyor surface; however, the rows of louvers can also be defined as traversing laterally across the conveyor surface. That is, depending upon the various embodiments disclosed herein, the first and second sets of louvers can be defined as arrangements of either laterally or longitudinally extending rows that traverse the conveyor surface.

By varying either the number of downstream louvers with respect to the upstream louvers or by varying the size of the individual louver openings, a very precise flow of the containers can be obtained without the necessity to vary static air pressure in the plenum or to provide dampers at various incremental locations within the plenum. Also, with the use of both downstream and upstream louvers, the volume of air contacting the articles at any location between an upstream location and a downstream location along the conveyor is the same thereby causing the articles to move at a substantially constant speed. This speed is determined by the differential air volume in the downstream direction relative to the upstream air volume. With this construction, articles such as cylinders open at both ends and lightweight articles such as STYROFOAM® plates can be conveyed without being blown off of the conveyor.

Additional advantages of this invention will become apparent from the description which follows, taken in conjunction with the accompanying drawings.

BEST MODE FOR CARRYING OUT THE INVENTION

Figure 1:
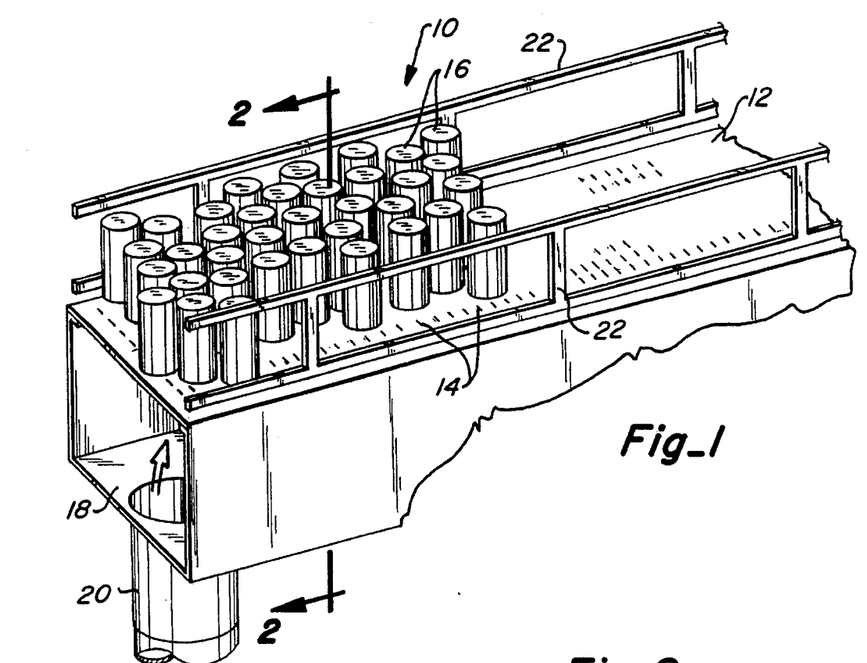
FIG. 1 is a fragmentary perspective view of a conveyor constructed in accordance with this invention.
Figure 2:
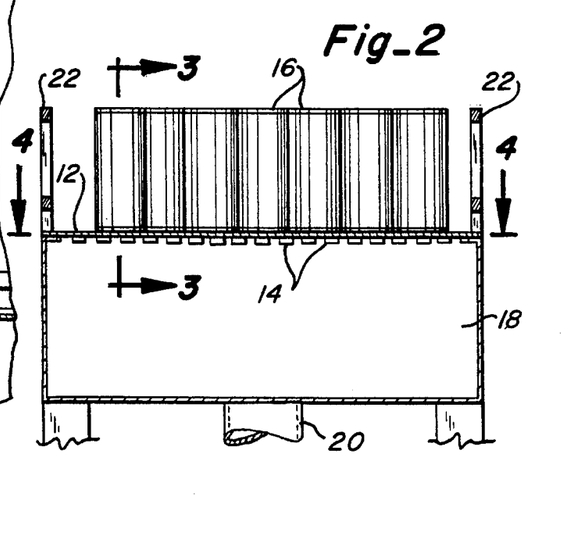
FIG. 2 is a vertical section, taken along line 2—2 of FIG. 1, showing further details of the conveyor.
Figure 3:
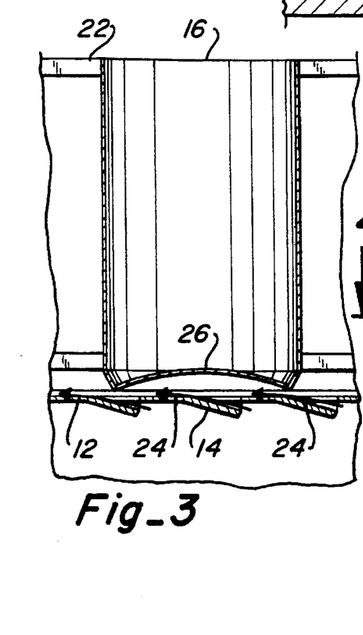
FIG. 3 is an enlarged vertical section, taken along line 3—3 of FIG. 2, showing the air flow through the louvers with respect to the bottom of a container on the conveyor.

In accordance with this invention, as seen in FIGS. 1–3, a conveyor 10 is provided which has a conveying surface in the form of a deck 12 with louvers 14 therein for conveying containers 16 from an upstream location to a downstream location as will be more fully discussed below. A plenum 18 is attached to the bottom side of deck 12 and is supplied by air from a common air supply, such as a blower (not shown) through an inlet 20. Open rails 22 are provided along the outboard edges of deck 12 to hold the containers on the conveying surface. As seen in FIG. 3, the air passes through the louvers and, due to the Coanda Effect, travels along the surface of the deck in the direction of arrows 24. The flow of air emitted from the louvers creates a low pressure area thereby holding the bottom 26 of container 16 closely adjacent the deck 12. The principles of this feature of the invention will be more fully explained below.

Figure 4:
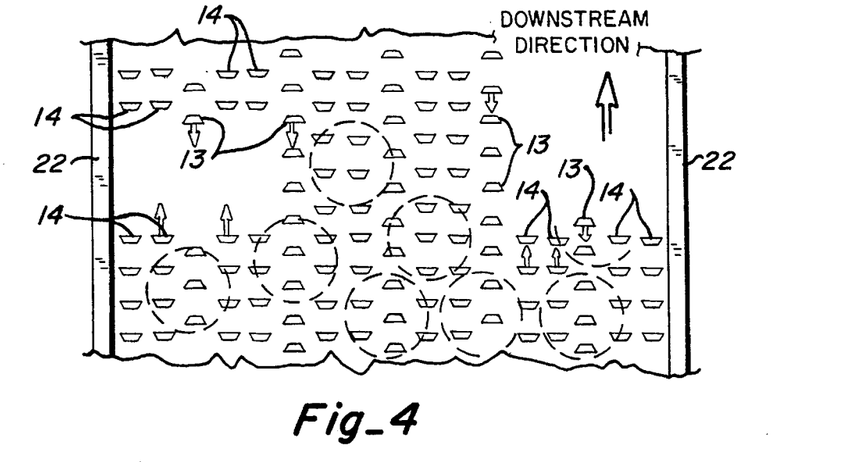
FIG. 4 is an enlarged fragmentary plan view of one conveyor surface constructed in accordance with this invention.
Figure 5:
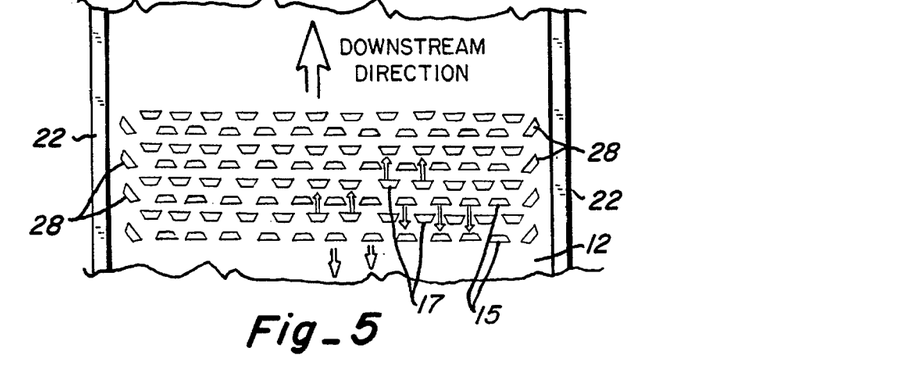
FIG. 5 is a fragmentary plan view, similar to FIG. 4, but showing an alternative louver arrangement.

The isometric deck design of this invention is based upon opposing air volumes at identical velocities. A preferred longitudinal louver design across the conveyor deck width is shown in FIG. 4. In this embodiment, the first two longitudinal rows of louvers 14 from each outboard edge direct flow in the downstream flow direction. Then the next inboard row of longitudinal louvers 13 is in the opposing upstream direction followed by the next two inboard rows of longitudinal louvers 14 in the downstream flow direction and then repeating the pattern. Assuming a total of 23 longitudinal rows, the following will exemplify the pattern, 16 longitudinal rows are in the downstream flow direction and seven longitudinal rows are in the upstream opposing upstream flow direction. This gives 228% more louvers in the downstream flow direction. To achieve a desired single container maximum speed along deck 12, assume that 25% more air volume in the downstream flow direction than the upstream opposing direction is desired. 228% less 25%=203%. This requires an increase in the louver area of the seven rows of upstream louvers 13 with respect to the downstream flow louvers by 203% over the 16 rows of the downstream flow louvers 14. When the louvers are defined in lateral rows, according to FIG. 5, a first set of lateral rows 15 laterally extend or traverse across the conveyor surface wherein an interspersed and alternating second set of lateral rows 17 extend or traverse laterally across the conveyor surface. The first set of louvers 15, as shown in FIG. 5, direct flow in the upstream direction and the second set of louvers 17 direct flow in the downstream direction. To achieve a desired single container maximum speed when the rows are defined laterally, the same type of calculations as described above with respect to FIG. 4 can be made. That is, providing more louvers in the downstream direction and then adjusting the area of the louvers in the upstream direction is one manner in which desired speed can be achieved.

Figure 6:
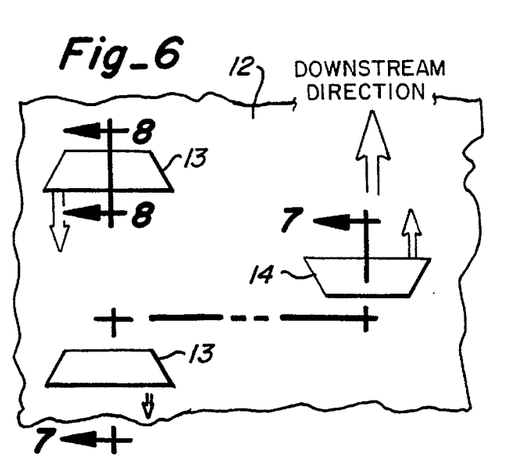
FIG. 6 is a greatly enlarged fragmentary section of a portion of a conveyor surface, taken along line 6—6 of FIG. 4, showing details of the louver arrangement.
Figure 7:
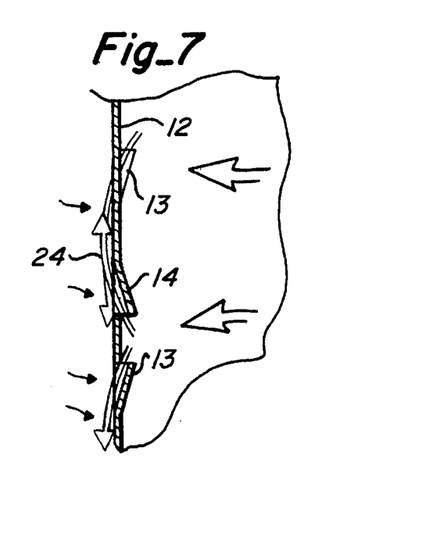
FIG. 7 is an off-set horizontal section, taken along line 7—7 of FIG. 6, showing further details of the louver construction.
Figure 8:
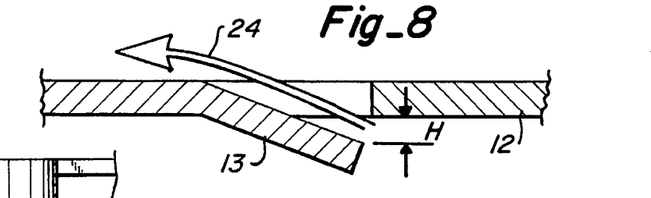
FIG. 8 is a greatly enlarged horizontal section, taken along line 8—8 of FIG. 6, showing the air flow through a louver.
Figure 9:
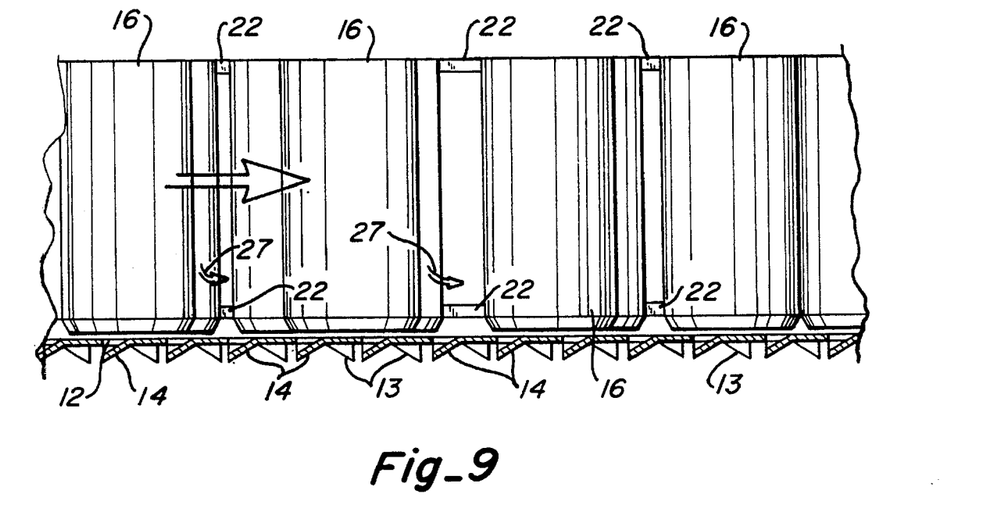
FIG. 9 is a vertical section, similar to FIG. 3, but showing a mass of containers along the conveyor.

The louver in the deck is of a trapezoid design, as shown in FIGS. 6 and 7. With this design, the cross-sectional area of the louver may be varied within very close parameters which also controls the volume of air dispersed through the louver. Referring to the above FIG. 4 example, the areas of the louvers in the seven rows could be increased by increasing the height H of the louver opening, as shown in FIG. 8, by a few more thousands of an inch, and the volume of air dispersed from the seven rows can be increased. Clearly, by varying height H the vector force differential can be precisely controlled. Ambient air is also drawn in through side rail 22, as shown by arrows 27 in FIG. 9, which assists in moving the containers in the downstream direction.

It is by this design that a very precise, infinitely controllable, air conveyor may be designed to suit any required parameters. This precise control is made possible by today's very sophisticated NC punching equipment. When the deck is designed using a CAD system and a computer program which calculates the percent of variation in the louver area by simply varying the height H of the louver opening, air conveying is taken into an entirely new era making it possible to do things that were considered highly unlikely or impossible only a short time ago. Thus, the manufacturing costs of air conveyors is significantly reduced over commercially available air conveyors which require dampers every eight feet or so along the plenum or axial vane dampers in the blower supplying the air to the conveyor. Also, no top cover is required.

It can be seen that by varying the louver height H or the number of louvers in the upstream or downstream direction, the isometric deck design may be configured to decelerate random containers prior to entering a turn and accelerate them out of the turn at any point within the turn and then resume the maximum set speed. If the air conveyor were to interface with a mechanical conveyor supplying the containers, the isometric deck design may be configured to accelerate the containers away from the mechanical conveyor so as to disperse the density at which they are being supplied and then a gradual deceleration to the maximum set speed.

Based upon preliminary time studies along an eight-foot portion of the length of a sixteen foot long conveyor with the isometric design, a single 12 oz. aluminum 211×413 trimmed container with the open end up can travel at approximately 200 feet per minute and impact a static barrier of containers without falling over or causing any container damage. Tests were also run with the container impacting a fallen container and no upsetting occurred.

Based on the above test results, the following has been generated by way of example only:

Conveyor width between guide rails 17½"
7 containers wide × 4.6 containers/lineal
ft. = 32.2 containers/lineal ft.
Desired container per minute rate = 2500 CPM

| Container Density | Containers/ Lineal Ft. | FPM @ 2500 CPM | Estimated CPM |
|---|---|---|---|
| 100% | 32.2 | 80 FPM | 2576 |
| 87% | 28.0 | 90 FPM | 2520 |
| 75% | 24.0 | 104 FPM | 2496 |
| 62% | 20.0 | 125 FPM | 2500 |
| 50% | 16.0 | 156 FPM | 2496 |
| 43% | 14.0 | 179 FPM | 2506 |
| 40% | 13.0 | 192 FPM | 2496 |

The above is a deck design which will propel a single container along any distance at a maximum speed of approximately 200 FPM without a top cover on the air conveyor. This same deck design is also capable of conveying any container density shown at the FPM shown with minimum static pressure within the plenum. The container-to-container impact noise is extremely low. The containers are conveyed so gently that no container damage was detected.

By using one or more rows of longitudinal louvers near each of the outboard edges of the conveyor directed at an inboard angle, a cross flow of air over the conveying surface is created. A example of this is shown in FIG. 5 wherein an outboard row of longitudinal louvers 28 are angled inwardly with respect to the direction of travel.

Figure 10:
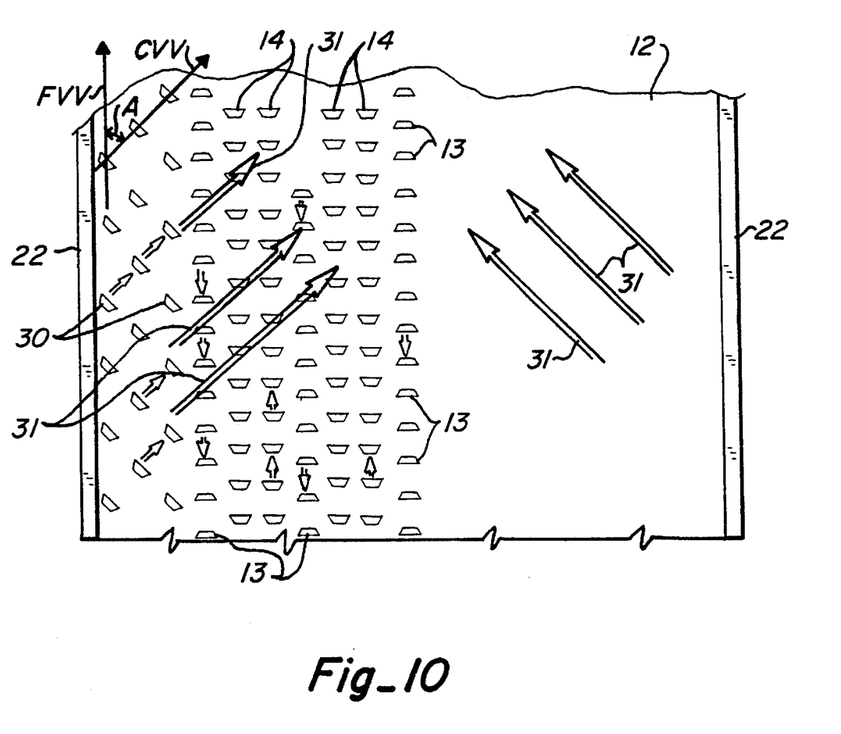
FIG. 10 is a fragmentary plan view, similar to FIGS. 4 and 5, showing a third alternative louver arrangement.

A still further embodiment is shown in FIG. 10 wherein three diagonal extending rows of angled louvers 30 are provided along each outboard edge of deck 12. This creates cross flow air which acts as a barrier through which a single or sparse flow of containers must move. This cross flow air also has a drafting effect on the back or trailing side of the single or sparse flow of containers creating a low pressure area which pulls this trailing edge toward deck 12. On the other hand, when a mass of containers, say 100% density, are on the conveyor, then the cross flow air is restricted and the louvers act only on the bottom of containers to move the mass of containers in the downstream direction due to the net downstream force vector, previously described.

With the above method applied, it is possible to achieve a controlled single, sparse or mass flow of containers at speeds that are substantially the same.

As the angle A, shown in FIG. 10, of the angled louvers 30 is changed, the flow direction of the air, as depicted by arrows 31, is changed. The more perpendicular to the side of the conveyor the angle is, the more air resistance a single or sparse flow of containers have to move through and the greater the drafting effect becomes on the trailing edge of the containers. This occurs as a result of fewer louvers being covered by containers which allows the air from the uncovered louvers to flow freely across the conveyor deck surface. As shown in FIG. 10, the cross volume and velocity force vector (CVV) is the major factor in the above-discussed control.

As the containers become more densely packed on the conveyor, more louvers are covered and the space for free air flow becomes quite restricted. As a result, it is just the louvers beneath the containers that are acting on the containers. Under this condition, the flow volume and velocity force vector (FVV) is the major factor for this control.

The greater the volume of air discharged through the angled louvers 30, the more effective they will be in slowing the speed of single or sparse containers, yet at the same time, the angled louvers 30 will be effectively increasing the speed of densely grouped containers that pass over louvers 30.

By way of example, an object, such as a 12 oz. aluminum container, requires 0.5 inches of static pressure to provide an optimum volume of air beneath it to levitate it about 0.005 inches above the conveyor deck. At a static pressure of 0.5 inches of water, the air velocity through louvers having an opening of 0.00808 square inches is at a speed of 2,832 feet per minutes (FPM). If the inboard angle A of louvers 30 is sixty (60) degrees, the FVV is thirty percent (30%) of 2,832 FPM or 850 FPM, a desirable speed for conveying a dense pack of containers.

When the containers are being supplied onto the air conveyor randomly, the speed of the single and sparse flow will be controlled by the combination of the reverse and downstream louvers and CVV.

In tests, it has been possible to achieve a speed of 174 FPM on a single container and 151 FPM on a dense pack. These speeds are very acceptable to meet most any conditions. The significance of this is that there is no container damage on single containers and because of a very low downstream speed differential between single and densely packed containers since very little pressure is exerted on the containers with respect to each other.

Controlling the speed of a container in an air conveyor is an absolute prerequisite in today's market because of the ever increasing lighter containers. The lighter the container, the more it is susceptible to damage from container-to-container impact or container-to-guide rail impact at turns in the conveyor which are downstream of a straightaway conveyor section.

Figure 11:
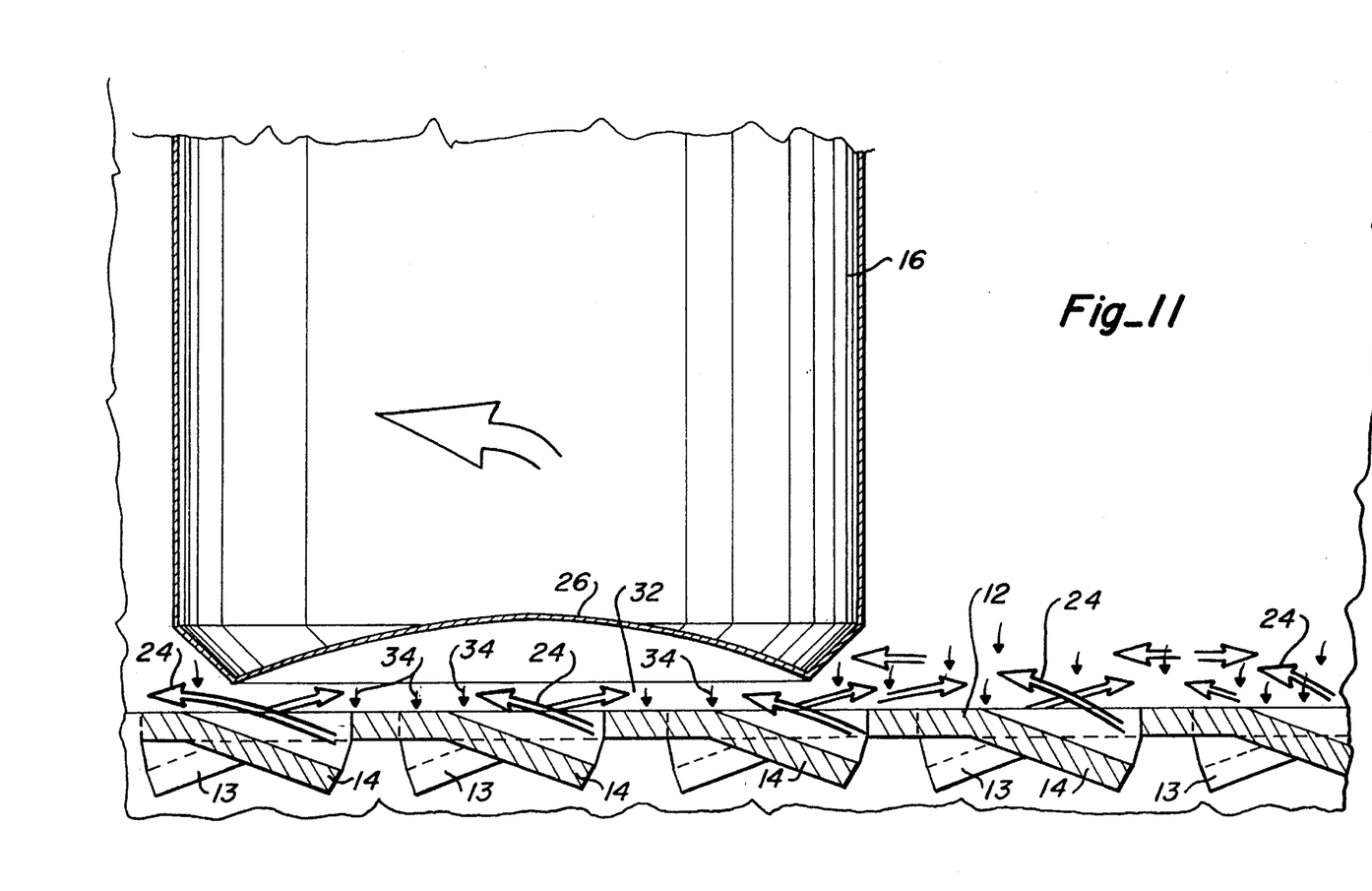
FIG. 11 is a greatly enlarged vertical section of a portion of the conveyor surface showing the flow of air through the louvers with respect to the bottom surface of a container.

The angle of incline of the louvers from the deck surface is approximately 25° to 30°, as seen in FIGS. 8 and 11, creating a laminar flow of air across the deck surface, because of the Coanda Effect, which air travels at a high velocity relative to the surrounding ambient air. The angle of incline range set forth above is exemplary only. The actual angle may be somewhat greater or lesser. This greater air speed produces a decrease in pressure in accordance with the Bernoulli Principle. The Coanda Effect is the tendency of a jet of gas when discharged adjacent a surface to follow that surface even though it curves away from the jet axis. This causes entrainment of ambient air surrounding the wall thereby reducing the pressure above it.

This low pressure area 32, in FIG. 11, acts to stabilize and pull the container toward the deck, as illustrated by arrows 34 while the air escaping beneath the diameter of the container, through the very slight 0.003 inch to 0.005 inch vertical space between the deck and the bottom of the container, also creates a low pressure area further enhancing the drafting effect to draw the container toward the deck surface.

The shallow angle of incline of the louvers to the deck surface maintains the majority of the air flow at or very near the base of the container which is well below the center of gravity of the container. By minimizing the flow of air upward above the container center of gravity, the stability of the container is greatly enhanced on an individual basis and may be conveyed singly or randomly spaced apart and not be dependent upon adjacent contiguous containers for support to prevent tippage as they are when conveyed en masse.

From the foregoing, the advantages of this invention are readily apparent. A damperless, controlled speed, coverless air conveyor has been provided in which damage of fragile containers, such as lightweight aluminum beverage containers, is greatly minimized. By the use of an isometric design in which one set of louvers directed downstream and a second set of louvers directed upstream, the number and/or size of the louvers can be varied to provide a very precise differential downstream air flow to upstream air flow to very precisely control the speed of a mass of containers moving from an upstream location to a downstream location along the conveyor. In addition, by providing one or more outboard louvers angled in a downstream and inboard direction, air barriers can be created by the cross flowing air to impede the movement of single or sparsely bunched containers so that they do not reach terminal velocity but rather flow at approximately the same rate as a mass of containers. In addition, by varying the number or size of the louvers along the deck, precise increases and decreases in the velocity of the containers can be obtained as required for making turns or entering or leaving a mechanical conveying device. Also, the net air volume in the downstream direction is substantially the same at an incremental position along the deck surface when the ratio of downstream louver area to upstream louver area is constant. With this arrangement, the deck can have an upward incline from the upstream location to the downstream location of 5/16 per linear foot without requiring additional static pressure for moving the article. This isometric conveyor of this invention is usable with aluminum, steel, and plastic containers, as well as cylinders which are open at both ends and flat STYROFOAM® plates.

This invention has been described in detail with reference to particular embodiments thereof, but it will be understood that various other modifications can be effected within the spirit and scope of this invention.

I claim:

1. A conveyor surface adapted especially for use in an air conveyor for conveying by air articles en masse at a controlled speed from an upstream location to a downstream location, said conveyor surface comprising:

a first set of rows of louvers extending laterally across said conveyor surface and extending through said conveyor surface at an incline to said conveyor surface, so that the air passing therethrough has a downstream force vector of a first magnitude; and a second set of rows of louvers selectively spaced longitudinally from said first set of rows of louvers and extending laterally across said conveyor surface and passing through said conveyor surface at an incline to said conveyor surface, so that the air passing therethrough has an upstream force vector of a second magnitude which is less than said first magnitude thus creating a vector force differential in a downstream direction to cause the mass of articles to move to the downstream location;

wherein said first set of rows of louvers and said second set of rows of louvers are positionable in alternating arrangement.

2. A damperless, controlled speed, coverless, isometric air conveyor for conveying articles en masse at a controlled speed, said isometric conveyor comprising:

a conveyor surface extending from an upstream location to a downstream location for moving the articles en masse from said upstream location to said downstream location, said surface having first and second opposite side edges and an underside;

a common plenum connectable to a source of air under pressure and attached to said underside of said conveyor for supplying the air under pressure;

a first set of rows of louvers extending laterally across said conveyor surface and through said conveyor surface from said common plenum at an incline to said conveyor surface so that the air passing therethrough has a downstream force vector of a first magnitude; and a second set of rows of louvers selectively spaced longitudinally from said first set of rows of louvers and extending laterally across said conveyor surface and through said conveyor surface from said common plenum at an incline to said conveyor surface so that the air passing therethrough has an upstream force vector of a second magnitude which is less than said first magnitude creating a vector force differential in the downstream direction to cause the mass of articles to move in a downstream direction from said upstream location to said downstream location.

3. Apparatus, as claimed in claim 2, wherein:

said first and second set of louvers create substantially the same amount of net air volume in the downstream direction at any incremental location from said upstream location to said downstream location so that the articles move at a constant uniform speed from said upstream location to said downstream location.

4. Apparatus, as claimed in claim 2, wherein:

there are a greater number of louvers in said first set of louvers than in said second set of louvers to create said vector force differential.

5. Apparatus, as claimed in claim 2, wherein:

the first set of louvers has a greater total open area than said second set of louvers to create said vector force differential.

6. Apparatus, as claimed in claim 2, wherein:

said first and second sets of rows of louvers are positionable in alternating row arrangement.

7. Apparatus, as claimed in claim 6, further including:

a third set of louvers arranged along each of said first and second opposite side edges of said conveyor, said third set of louvers having an inboard force vector which creates an air barrier through which a single article or sparse articles in a flow of the mass of articles must move to limit the speed of the articles.

8. Apparatus, as claimed in claim 2, wherein:

each louver of each of said first and second sets of louvers is formed in said conveyor at an acute incline with respect to said conveyor surface so that the air emanating from said louvers travels substantially parallel to said conveyor surface creating a lower than ambient air pressure between a bottom surface of the articles and the conveyor surface to hold them in upright position and in close proximity to said conveyor surface and cause ambient air to be drawn across said first and second opposite side edges to push the articles along said conveyor surface from said upstream location to said downstream location.

9. Apparatus, as claimed in claim 8, wherein:

the air emanating from the louvers tends to move along said conveyor surface due to the Coanda Effect and the velocity of the moving air creates the low pressure due to the Bernoulli Principle.

10. A method of conveying articles en masse at a controlled speed along a damperless, coverless, isomeric air conveyor from an upstream location to a downstream location wherein the air conveyor includes a mass conveyor surface extending from the upstream location to the downstream location and a common air plenum for supplying air to the conveyor surface, said method comprising:

directing air along the conveyor surface from the common plenum at an upward incline thereto by passing the air through a first set of rows of laterally extending louvers so that the air has a downstream vector of a first larger magnitude;

directing air along the conveyor surface from the common plenum at an upward incline thereto by passing the air through a second set of rows of laterally extending louvers selectively and longitudinally spaced from said first set of rows of louvers, and wherein the first and second sets of rows of louvers are positionable in alternating arrangement so that the air has an upstream vector of a second lesser magnitude to provide a differential force vector in the downstream direction; and moving the articles from the upstream location to the downstream location along the conveyor surface by the air passing through the first and second sets of rows of louvers.

11. A method, as claimed in claim 10, including the further step of:

providing a uniform net volume of air from the common plenum in the downstream direction at any incremental location between the upstream location and the downstream location.

12. A method, as claimed in claim 10, including the further step of:

providing a cross flow of air across the conveyor surface from the common plenum to create an air barrier to inhibit movement of single or sparse articles of the mass of articles in the downstream direction and to create a low pressure area at trailing edges of such articles to stabilize their movement along the conveyor.

13. A method of conveying articles en masse at a controlled speed along a damperless, coverless, isometric air conveyor from an upstream location to a downstream location wherein the air conveyor includes a conveyor surface extending from the upstream location to the downstream location, said method comprising:

providing a first set of rows of louvers extending laterally across the conveyor surface and through the conveyor surface at an incline so that the air passing therethrough has a downstream vector of a first magnitude;

providing a second set of rows of louvers extending laterally across the conveyor surface and selectively spaced longitudinally from the first set of rows of louvers and through the conveyor surface at an incline so that the air passing therethrough has an upstream vector of a second magnitude, and wherein the first and second sets of rows of louvers are positionable in alternating arrangement;

supplying air to the first and second sets of louvers from a common plenum at a pressure and volume sufficient to elevate the articles above the conveyor surface;

directing air through the first and second sets of louvers in a direction substantially parallel to the conveyor surface to create a lower than ambient pressure area between a bottom surface of the articles and the conveyor surface to hold them in an upright position and in close proximity to the conveyor surface;

adjusting the total area of the first set of louvers with respect to the total area of said second set of louvers so that the first magnitude vector is greater than the second magnitude vector; and moving the articles from the upstream location to the downstream location along the conveyor surface by the air passing through the first and second sets of louvers.

14. A method, as claimed in claim 13, including the further step of:

varying the total area of the first set of louvers with respect to the area of the second set of louvers to vary the speed of movement of the articles from the upstream location to the downstream location.

15. A method, as claimed in claim 13, including the further step of:

providing a cross flow of air across the conveyor surface to create an air barrier to inhibit movement of single or sparse articles in the downstream direction and to create a low pressure area at trailing edges of such articles to stabilize their movement along the conveyor.

* * * * *